(12) United States Patent
Bong

(10) Patent No.: US 8,748,772 B1
(45) Date of Patent: *Jun. 10, 2014

(54) RIGID SERRATED SURFACE FOR WELDING SHOES

(76) Inventor: William L. Bong, Walnut Creek, CA (US)

( * ) Notice: Subject to any disclaimer, the term of this patent is extended or adjusted under 35 U.S.C. 154(b) by 178 days.

This patent is subject to a terminal disclaimer.

(21) Appl. No.: 13/187,681

(22) Filed: Jul. 21, 2011

(51) Int. Cl.
*B23K 25/00* (2006.01)
(52) U.S. Cl.
USPC .......................... 219/73.1; 219/73; 219/73.21
(58) Field of Classification Search
USPC .............. 219/73.1, 73.21, 73.14, 76.1, 76.14, 219/126, 145.1
See application file for complete search history.

(56) References Cited

U.S. PATENT DOCUMENTS

| | | | | | |
|---|---|---|---|---|---|
| 3,910,807 | A | * | 10/1975 | Heinzer | 156/379.8 |
| 4,401,168 | A | * | 8/1983 | Claringbull | 173/135 |
| 4,458,522 | A | * | 7/1984 | Toelke | 73/49.5 |
| 4,957,628 | A | * | 9/1990 | Schulz | 210/519 |
| 6,065,284 | A | * | 5/2000 | Horner et al. | 60/203.1 |
| 7,387,710 | B2 | * | 6/2008 | Bengtsson | 162/358.3 |
| 2001/0045420 | A1 | * | 11/2001 | Bong et al. | 219/125.1 |
| 2002/0005397 | A1 | * | 1/2002 | Bong et al. | 219/125.1 |
| 2005/0023262 | A1 | * | 2/2005 | Bong et al. | 219/130.5 |
| 2007/0050930 | A1 | * | 3/2007 | Holmes | 15/104.05 |
| 2007/0181342 | A1 | * | 8/2007 | Duncan | 175/57 |

FOREIGN PATENT DOCUMENTS

FR 2569954 * 3/1986

* cited by examiner

*Primary Examiner* — Henry Yuen
*Assistant Examiner* — Ayub Maye
(74) *Attorney, Agent, or Firm* — Charles L. Thoeming

(57) ABSTRACT

Opposing, paired and positionally adjustable serrated water-cooled copper welding shoes, run-off tabs, and sumps affixed at the junction of workpieces to be welded with an Electroslag or Electrogas welding system. The serrated water-cooled copper welding shoes are capable of being controlled between 150 to 200 degrees Fahrenheit, and the welding flux plating over the serrations reduces over-chill to the molten weld puddle while also reducing the amount of heat that the serrated water-cooled shoe removes from the surface of the work piece. This reduction in base material heat allows the welding operator to reduce the weld voltage to dramatically decrease the size of the weld nugget and, in turn, to decrease the heat input from the welding process into the work piece. These significant thermo-dynamic improvements to the Electroslag or Electrogas welding process provide a smaller weld grain structure and much stronger bond in the weld fusion zone.

7 Claims, 6 Drawing Sheets

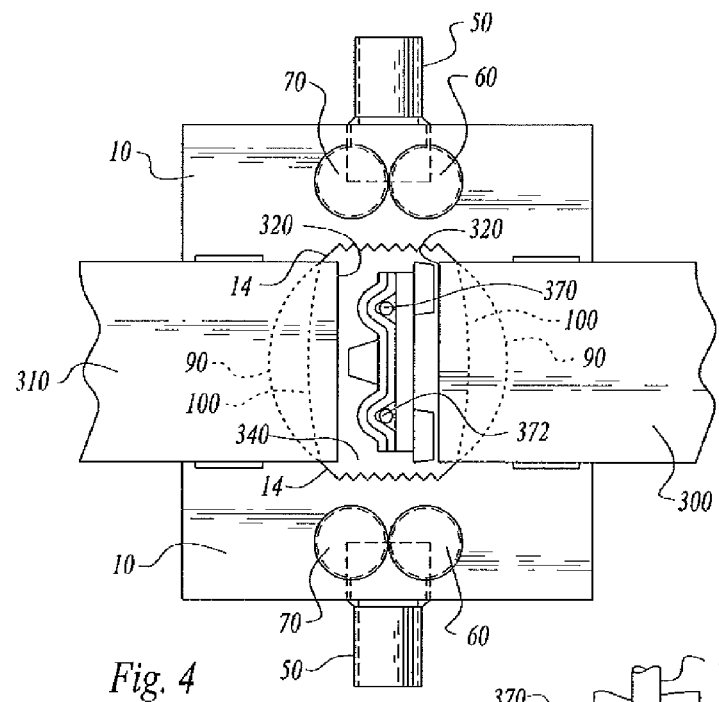
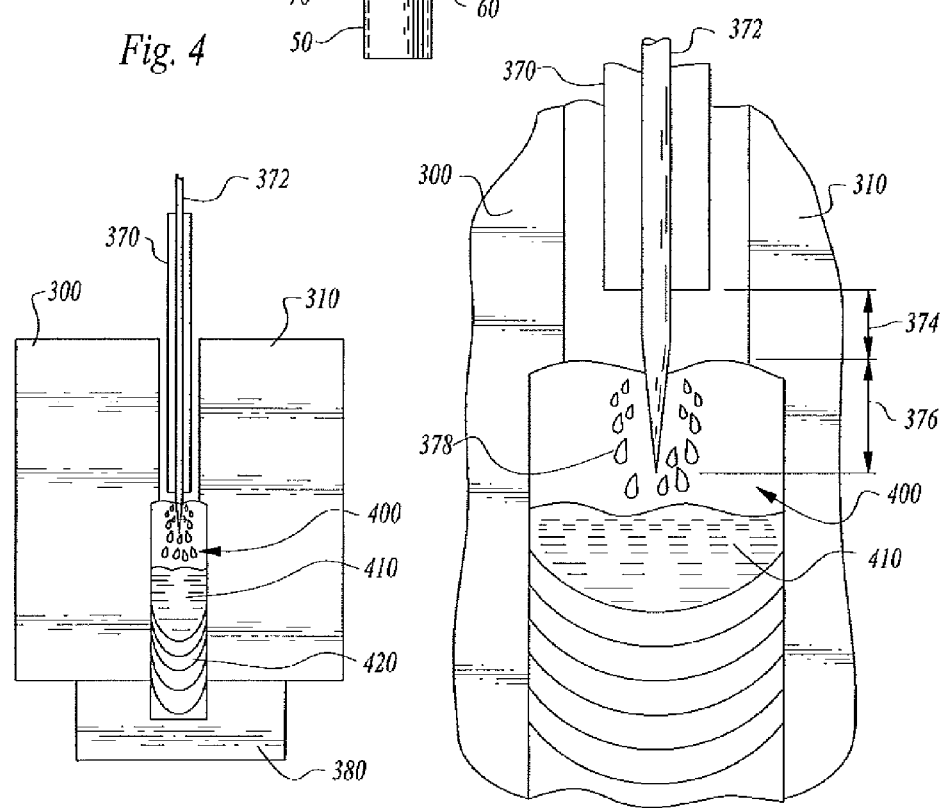
Fig. 4
Fig. 5
Fig. 5A

RIGID SERRATED SURFACE FOR WELDING SHOES

CROSS-REFERENCES TO RELATED APPLICATIONS

None.

STATEMENT REGARDING FEDERALLY SPONSORED RESEARCH OR DEVELOPMENT

None.

REFERENCE TO A MICRO-FICHE APPENDIX

None.

TECHNICAL FIELD

This invention relates to welding. More particularly, the invention is related to serrated water-cooled copper shoes for use in welding, particularly for Electroslag or Electrogas welding applications.

BACKGROUND OF THE INVENTION

Water-cooled copper welding shoes presently used for Electroslag or Electrogas welding applications keep the molten weld metal and flux bath contained in the weld cavity. Water circulates through the copper shoes at a flow rate of approximately 2 gallons per minute. This flow rate is sufficient to keep the copper shoes from melting from excessive heat. In consumable-guide Electroslag or Electrogas welding, the shoes do not move. For longer joints the shoes are repositioned in a leapfrog manner, as welding continues upward. In non-consumable guide Electroslag or Electrogas welding the shoes move vertically upward with the vertical rate of rise (VRR) of the molten weld puddle.

Arcmatic® VertaSlag® Butt-Weld Water-Cooled Shoes are either cast or machined into the desired shape from pure Oxygen Free, High Conductivity pure #101Copper (OFHC-101). When machined into shape, two holes are drilled into the length of the shoe to provide an interior passage for water flow. A recess (⅛ inch deep by 1 inch wide) is machined into the front face of each shoe to shape the weld reinforcement.

Chamfered edges are provided on either side of the relieve groove where the serrated water-cooled copper shoes make contact with the parent material during the ElectroSlag or Electrogas welding process. These chamfered edges help the molten weld metal wet against the parent material, to provide complete penetration into the four corners of the weld cavity to provide and provide a smooth transition between the weld metal and the parent material. On conventional water-cooled copper shoes, each shoe has a national pipe thread (NPT) threaded hole on the input and output for connecting water circulation hose couplings. Internal threaded couplings are attached to the threaded holes and silver-soldered into position to prevent water leaks.

Two relief grooves are machined into the front face of each serrated water-cooled copper shoes, located on either side of the relief groove. These relief grooves serve to reduce the amount of surface area on the face of the serrated water-cooled copper shoe that fits tightly against the parent material. Reducing the surface area, in turn reduces the amount of heat that the serrated water-cooled copper shoe removes from the surface of the parent material. This reduction in base material heat allows the welding operator to reduce the weld voltage to dramatically decrease the size of the weld nugget and, in turn, decreases the heat input from the welding process into the work piece. This reduction in work piece heat input reduces the size of the weld nugget, and the Heat Affected Zone ("HAZ"). This reduction in overall heat input dramatically improves the physical quality of the weld. The VertaSlag® Butt-Weld Shoe is provided in two different widths: 3 inches wide and 4 inches wide (both available in a variety of lengths.

Each serrated surface of the relief groove of the Arcmatic® serrated water-cooled copper shoe serves to increase the thickness of the flux coating to the water-cooled copper shoe. This increase in flux coating serves to insulates the weld puddle from excessive cooling from the water-cooled shoes. This reduction in weld puddle cooling allows the welding operator to reduce the weld voltage to dramatically decrease the size of the weld nugget and, in turn, decreases the heat input from the welding process into the work piece. This reduction in work piece heat input further reduces the size of the weld nugget, and the HAZ.

The Arcmatic® serrated water-cooled copper shoes used in Electroslag or Electrogas welding applications require water-cooled Butt-Weld Shoes are used in pairs on either side of the welding joint. When placed against the parent material, cooling water should always enter the water-cooled copper shoe from the top access hole and exit from the bottom access hole. Water flowing from the top of the water-cooled copper shoe to the bottom of the copper shoe keeps cold water entering the shoe at all times.

Water-cooled copper shoes presently known in the art excessively cool the molten weld puddle. This over-chilling of the molten weld puddle makes it difficult for the weld puddle to melt the four corners of the weld cavity that are adjacent to the water-cooled shoes. If the molten weld puddle is not fused properly into the four corners of the weld cavity, costly weld rejects occur. To overcome this incomplete fusion into the four corners of the weld cavity, the welding operator must substantially increase the welding voltage. This excessive weld voltage increase then creates more heat input into the parent material, thus increasing the base metal dilution and the size of the HAZ.

It is, therefore, an object of the serrated water-cooled copper shoes to provide a lower welding torch voltage and still attain excellent wetting on the edges of the parent material in the weld cavity.

It is a further object of the serrated water-cooled copper shoes, used in Electroslag or Electrogas welding applications, to operate at a controlled welding shoe temperature range between of between 150 degrees Fahrenheit to 200 degrees Fahrenheit during the Electroslag or Electrogas welding operation.

It is yet another objective of the serrated water-cooled copper shoes, used in Electroslag or Electrogas welding applications, to substantially decrease the total heat input by substantially decreasing the required voltage for the Electroslag or Electrogas welding process.

Other features, advantages, and objects of the serrated water-cooled copper shoes for Electroslag or Electrogas welding applications will become apparent with reference to the following description and accompanying drawings.

These together with other objects of the serrated water-cooled copper shoes, used in Electroslag or Electrogas welding applications, along with the various features of novelty that characterize the serrated water-cooled copper shoes, are described with particularity in the claims attached to and forming a part of this disclosure. For a better understanding of the serrated water-cooled copper shoes, used in Electroslag or Electrogas welding applications, their operating advantages and the specific objects attained by their use, reference should be made to the attached drawings and descriptive materials in which there are illustrated preferred embodiments of the serrated water-cooled copper shoes.

DISCLOSURE OF INVENTION

To date, the welding industry has always used water-cooled copper shoes to make Electroslag or Electrogas welds. The reason for this is that the molten Electroslag flux puddle is at temperatures of approximately 3500 degrees Fahrenheit during the welding operation. The molten steel being welded melts at a temperature of approximately 2300-to-2500 degrees Fahrenheit. Copper melts at approximately 1900 degrees Fahrenheit. If some form of cooling is not applied to the copper, the temperature of the molten flux and molten steel will melt the copper.

Water-cooled Electroslag shoes do an excellent job in keeping the copper from melting. In addition to keeping the copper from melting, some welding engineers think it is necessary to use the water-cooled copper shoes to also keep the parent material from overheating. To accomplish this thermo-dynamic parameter, the water-cooled copper shoes are manufactured to be a maximum of four inches wide for narrow-gap Electroslag or Electrogas welding. The popular theory is that this water-cooled copper shoe width will keep the heat affected zone HAZ much smaller, allowing better physical characteristics for a better quality weld. The new addition of narrow-gap Electroslag or Electrogas welding ("ESW-NG") to the American Welding Standards ("AWS") D1.5-2010 Bridge code requires that the water temperature to-and-from the water-cooled copper shoes be controlled within a very narrow temperature range. To attain this standard requires a very large flow of cold water, at relatively high pressure, to maintain the temperature of the water-cooled copper shoe within the narrow limits of the AWS D1.5-2010 code for ESW-NG welding.

The problem with this excessive cooling of the base material on either side of the Electroslag or Electrogas weld joint also over chills the temperature of the weld puddle. This over chilling of the weld puddle makes it very difficult to melt the four corners of the weld cavity (of the parent material) nearest to the water-cooled shoes. To have the temperature of the parent material high enough to melt the corners of the weld cavity requires excessively high voltage levels. For instance, a typical welding procedure for heavy plate may require 1000-Amps at 38-Volts. Therefore, the total wattage into the weld can be expressed by the product of Amperage times the quotient of Voltage divided by the travel speed. If the weld is traveling at 2 inches/minute, the heat input equation would be expressed as $((1000\text{-Amps} \times (38\text{-Volts}/2 \text{ inches/minute}))=19\text{-KiloWatts/inch})$, resulting in the calculated input wattage into the weld.

During an Electroslag or Electrogas welding operation, the new Arcmatic® "Serrated Water-Cooled VertaSlag® Butt Welding Shoe", using serrated surfaces of the water-cooled copper shoe relief groove adjacent to the weld puddle and weld cavity, allows welding flux to flow into the serrated grooves of the copper shoe. Because of the depth of the grooves, the flux buildup on the surface of the serrations is much thicker than a water-cooled shoe without serrated grooves. This thicker flux buildup acts as an insulator between the surface of the water-cooled copper shoe and the molten weld puddle, allowing the molten weld puddle to stay hot and flow into the corners of the weld cavity. The flux buildup allows the center serrated copper shoe that comes in contact with the molten weld puddle to stay hot, while, at the same time, the edges of the water-cooled copper that do not have flux buildup on the surface, stay at 150 degrees Fahrenheit to 200 degrees Fahrenheit. This allows the previously mentioned weld to be made at 1000-Amps and 28-Volts (instead of 38-Volts). Another factor that affects the total heat input into the weld is that the high temperature of the serrated water-cooled copper shoe, allows the weld travel speed to be substantially increased. If the voltage is decreased from 38V to 28V, the total wattage into the weld would then equal 14 kilowatts $(1000 \times 28/2 = 14\text{-KW})$ instead of the 19-kilowatts required when welding with standard water-cooled copper shoes—26% reduction in heat input compared with using standard water-cooled shoes.

This massive heat reduction will result in a smaller HAZ and far less base metal dilution. The base metal dilution of the 38-Volt weld will require approximately 50% of the base material, while the 28-Volt weld will require approximately 30-to-40% base metal dilutions. Lower heat input and lower base metal dilution will result in a smaller grain structure in the weld and a much better toughness (higher charpy impact test results) in the weld metal and the HAZ.

Other features, advantages, and objects of the serrated water-cooled copper shoes for Electroslag or Electrogas welding applications will become apparent with reference to the following description and accompanying drawings.

These together with other objects of the serrated water-cooled copper shoes for Electroslag or Electrogas welding applications, along with the various features of novelty that characterize the serrated water-cooled copper shoes for Electroslag or Electrogas welding applications, are described with particularity in the claims attached to and forming a part of this disclosure. For a better understanding of the serrated water-cooled copper shoes for Electroslag or Electrogas welding applications, the operating advantages and the specific objects attained by the use thereof, reference should be made to the attached drawings and descriptive materials in which there are illustrated preferred embodiments of the serrated water-cooled copper shoes for Electroslag or Electrogas welding applications.

BRIEF DESCRIPTION OF DRAWINGS

These and other features, aspects, and advantages of the serrated water-cooled copper shoes for use in welding, particularly for Electroslag or Electrogas welding applications will become better understood with regard to the following description, appended claims, and accompanying drawings as further described.

FIG. 4 is a top view of an embodiment of a representative pair of serrated water-cooled copper shoes 10 on either side of an example of an Electroslag or Electrogas weld joint for workpieces 300 and 310 showing the difference in base metal dilution from the heat affected zone 90 for typical water cooled copper shoes and the heat affected zone 100 for the embodiment of a representative pair of serrated water-cooled copper shoes 10.

FIG. 5 is a drawing of the ESW-NG Process showing a side view of the parent material workpieces, 300 and 310, the molten flux slag bath 400, and the molten weld metal 410, along with the location of the guide tube 370 and welding wire 372 in relationship to the molten welding puddles, 400 (flux slag bath) and 410 (weld metal).

FIG. 5A is a detail of the guide tube 370, welding wire 372, molten flux slag bath 400, molten weld material 410, and droplet transfer 378 of FIG. 5.

BEST MODE FOR CARRYING OUT THE INVENTION

Figure 3:
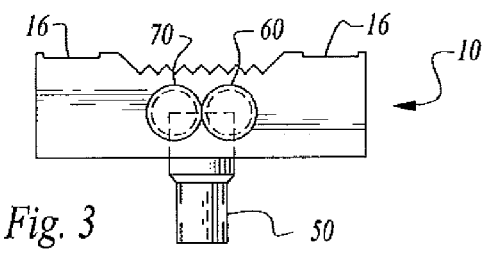
FIG. 3 is a top view of the embodiment of a representative serrated water-cooled copper shoe 10 of FIG. 1, depicting two plugs 60 and 70, and relief grooves 16.

One or more specific embodiments of the serrated water-cooled copper shoes for use in welding, particularly for Electroslag or Electrogas welding applications will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Arcmatic® has perfected Electroslag or Electrogas welding systems for vertically aligned workpieces and provides such Electroslag welding systems and methods, equipment, consumables, and operational controls under its registered VertaSlag® mark.

My following U.S. Letters Patent are incorporated by reference as if fully set forth herein: U.S. Pat. No. 6,297,472 for Welding System and Method, issued Oct. 2, 2001 (the "'472 patent"); U.S. Pat. No. 7,038,159 for Electroslag Butt-Welding Expansion Joint Rails, issued May 2, 2006 (the "'159 patent"); U.S. Pat. No. 7,148,443 for Consumable Guide Tube, issued Dec. 12, 2006 (the "'443 patent"); and U.S. Pat. No. 7,429,716 for Modular Welding System, issued Sep. 30, 2008 (the "'716 patent").

My following pending U.S. non-provisional patent applications are incorporated by reference as if fully set forth herein: U.S. application Ser. No. 11/591,190 for Consumable Guide Tube, filed Oct. 30, 2006 (the "'190 application"); U.S. application Ser. No. 12/212,019 for System and Method of Electroslag Welding Spliced Vertical Columns, filed Sep. 17, 2008 (the "'019 application"); U.S. application Ser. No. 12/352,297 for System and Method of Electroslag Welding Spliced Box Columns, filed Jan. 12, 2009 (the "'297 application"); U.S. application Ser. No. 12/475,110 for Air Cooled Copper Shoes for Electroslag Welding Applications, filed May 29, 2009 (the "'110 application"); U.S. application Ser. No. 12/475,015 for Air Cooled Copper Shoes for Electroslag Welding Applications, filed May 29, 2009 (the "'015 application"); U.S. application Ser. No. 12/474,859 for System and Method for Beam-to-Column Welding, filed May 29, 2009 (the "'859 application"); U.S. application Ser. No. 12/483,977 for System and Method for Vertical Moment Connection, filed Jun. 12, 2009 (the "'977 application"); and U.S. application Ser. No. 12/701,038 for Assembly, System and Method for Automated Vertical Moment Connection, filed Feb. 5, 2010 (the "'038 application").

Referring more specifically to the drawings, for illustrative purposes the apparatus for serrated water-cooled copper shoes for application in an Electroslag or Electrogas welding system and method is embodied generally in FIG. 1-13. It will be appreciated that the system may vary as to configuration and as to the details of the parts, and that the method of using the system may vary as to details and to the order of steps, without departing from the basic concepts as disclosed herein. The apparatus for serrated water-cooled copper shoes for application in an Electroslag or Electrogas welding system and method is disclosed generally in terms of welding vertical plate splices butted together (Butt-welds), welding plates that come together at a Tee angle (Tee-welds), and welds that are made by joining two plates in a corner at a 90-degree angle (L-Shaped corner weld), as this particular type of welding operation is widely used. However, the disclosed apparatus for serrated water-cooled copper shoes may be used in a large variety of Electroslag and/or Electrogas welding applications, as will be readily apparent to those skilled in the art.

Referring now to FIGS. 1-13, apparatus for serrated water-cooled copper shoes 10 for application in an Electroslag or Electrogas welding system and method in which at least one workpiece 300 and at least one second workpiece 310 are brought together so that a gap 320 exists between each pair of workpieces. The system 10 comprises at least one stationary welding fixture positioned [not shown] to releasably couple with at least one workpiece. The fixture further comprises at least one pair of opposing welding shoes 10 which are placed on each side of each gap 320 to form at least one welding cavity 340. The serrated water-cooled copper shoes 10 of the system make contact with the stiffener and column flange on either side of the welding cavity 340. The serrated water-cooled copper welding shoes 10 contain the molten weld material 410 and control the wetting action of the weld material 410 against the parent material of the workpieces, 300 and 310. The water cooled copper shoes are machined to provide perfect fit for shaping the Electroslag weld 420, and preventing weld leaks.

A welding torch [not shown—see, e.g., the '019 application] is configured to receive at least one consumable guide tube 370 and weld wire 372 which is placed into the welding cavity 340, FIGS. 4, 5, and 5A.

An embodiment of the serrated water-cooled welding shoes 10 which further comprise a thermally and electrically insulating coating of welding flux which fills into, builds up on, and plates over the serrated portion of the forward face of the welding shoe exposed to the welding cavity 340. This thicker plating of flux keeps the serrated water-cooled welding shoes 10 from over-chilling the molten weld metal 410 temperature of 3500 degrees Fahrenheit.

At least one sump 380 is provided adjacent to the bottom portion of each welding shoe pair, and at least one run-off tab [not shown—see, e.g., the '019 application] is provided adjacent to the top portion of each serrated water-cooled welding shoe 10 pair. Each pair of serrated water-cooled welding shoes comprises means for water-cooled temperature control of the serrated water-cooled welding shoes 10.

An embodiment of an Electroslag or Electrogas welding system using the serrated water-cooled welding shoes 10 comprises at least one distributed control system [not shown—see, e.g., the '472 patent, the '716 patent, and/or the '019 application]. Each distributed control system comprises a plurality of controller modules and a common bus connecting each of the plurality of controller modules, wherein each controller module comprises at least one operator control panel module. At least one control system including at least one controller module controls the temperature of the serrated water-cooled copper shoes during the Electroslag welding process by regulating the flow of water through the inlet/outlet manifolds, 40 and 50, and circulating through the water flow channels 20 and 30 of the copper buss bar 12 portion of the serrated water-cooled copper shoes. The inlet/outlet manifolds, 40 and 50, are adapted to couple to a water circulation system controlled by at least one control system including at least one controller module.

The preferred embodiment of a welding system, in which at least one pair of vertically aligned workpieces, 300 and 310 are brought together so that a gap 320 having a gap center line exists between the workpieces, 300 and 310, comprises: (a) at least one stationary welding fixture [not shown—see, e.g., the '019 application], each fixture comprising means for releasable coupling [not shown] to at least one workpiece, a pair of opposing serrated water-cooled copper welding shoes 10 placed on each side of the gap 320 to form a welding cavity 340 between the workpieces the shoes, and means for symmetrically positioning the welding shoes 10 adjacent the cavity 340; (b) at least one welding torch [not shown—see, e.g., the '019 application] configured to receive at least one consumable guide tube 370 which is placed into the welding cavity 40, the welding torch coupled to the welding fixture 12 adjacent to each center line; and (c) apparatus comprising: first and second elongated, parallel rotating shafts [not shown]; first and second linear actuators [not shown—see, e.g., the '472 patent, the '716 patent, and/or the '019 application], the actuators movably mounted on the rotating shafts; means for longitudinally translating the linear actuators along the shafts as the shafts rotate [not shown—see, e.g., the '472 patent, the 716 patent, and/or the '019 application]; means for sensing movement of the linear actuators [not shown—see, e.g., the '472 patent, the '716 patent, and/or the '019 application]; and protective housing means [not shown—see, e.g., the '472 to patent, the '716 patent, and/or the '019 application] for enclosing the rotating shafts, the actuators, the longitudinally translating means, and the sensing means, for oscillating each welding torch with the cavity.

An embodiment welding system using serrated water-cooled copper shoes 10 includes at least one articulating boom [not shown—see, e.g., the '472 patent, the '716 patent, and/or the '019 application], whereby each welding fixture [not shown—see, e.g., the '472 patent, the '716 patent, and/or the '019 application] is associated with an end of an articulating boom.

An embodiment of the welding system using serrated water-cooled copper shoes further comprises at least one flux dispenser [not shown—see, e.g., the '472 patent, the '716 patent, and/or the '019 application], each flux dispenser comprising: a hopper [not shown—see, e.g., the '472 patent, the '716 patent, and/or the '019 application; a rotating belt positioned below the hopper [not shown—see, e.g., the '472 patent, the '716 patent, and/or the '019 application]; a belt block [not shown—see, e.g., the '472 patent, the '716 patent, and/or the '019 application] having a recessed area housing the rotating belt; and at least one drop tube [not shown—see, e.g., the '472 patent, the '716 patent, and/or the '019 application] associated with a lower portion of the recessed area.

An embodiment of a welding system using the serrated water-cooled copper shoes further comprises at least one welding shoe bottom clamping assembly [not shown], each clamping assembly [not shown—see, e.g., the '019 application] comprising: first and second pairs of serrated water-cooled welding shoes 10; means for positionally adjusting the first pair of serrated water-cooled welding shoes 10 relative to each other; means for positionally adjusting the second pair of serrated water-cooled copper welding shoes 10 relative to each other; and means for positionally adjusting the first pair of serrated water-cooled copper welding shoes relatively to the second pair of welding shoes. The serrated water-cooled copper welding shoes 10 additionally may include a thermally and electrically insulating coating [not shown—see, e.g., the '443 patent" and/or the '190 application] on at least one face of each serrated water-cooled copper welding shoe 10.

Figure 1:
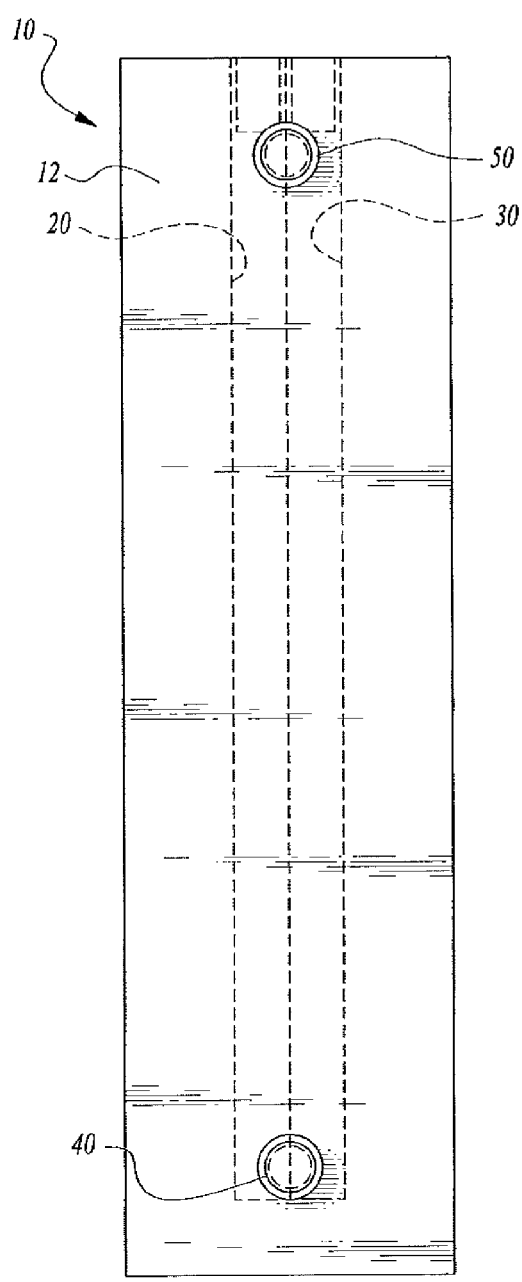
FIG. 1 is a front elevation view of an embodiment of a representative serrated water-cooled copper shoe 10 for Electroslag or Electrogas welding applications showing dual flow channels 20 and 30 of equal cross-sectional area drilled in a copper buss bar 12, inlet and outlet water manifolds 40 and 50.
Figure 2:
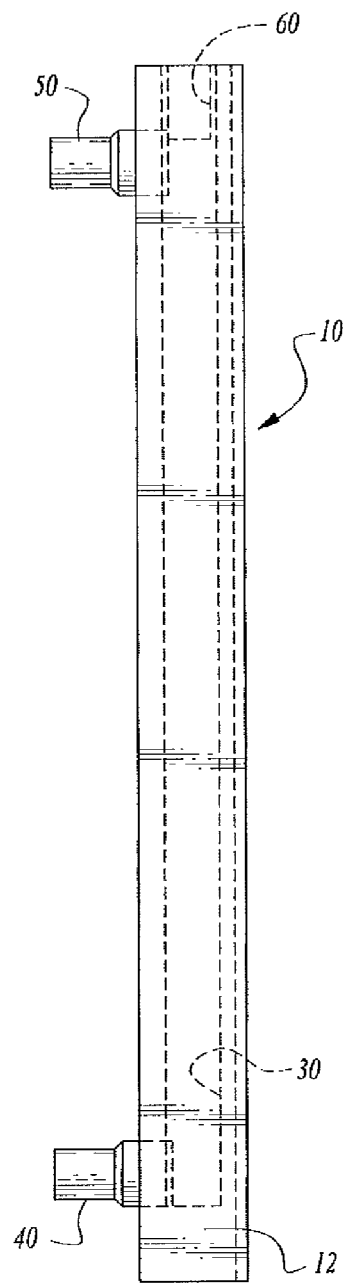
FIG. 2 is a side elevation view of the embodiment of a representative serrated water-cooled copper shoe 10 of FIG. 1.

An embodiment of a representative serrated water-cooled copper shoe 10 for Electroslag or Electrogas welding applications provides dual, side-by-side water flow channels 20 and 30 of equal cross-sectional area drilled in a copper buss bar 12, inlet and outlet water manifolds 40 and 50, and two plugs 60 and 70, FIGS. 1-3. The two plugs 60 and 70 are electron beam fusion welded into the top openings to close the top openings drilled into the copper buss bar 12 to form the dual flow channels 20 and 30. Each inlet and outlet water manifold, 40 and 50, respectively communicates with the flow channels 20 and 30. The serrated water-cooled copper shoes 10, manifolds, 40 and 50, manifold fittings and plugs, 60 and 70, are all fusion welded with electron beam fusion welds. Alternatively, the serrated water-cooled copper shoes 10, manifolds, 40 and 50, manifold fittings and plugs, 60 and 70, are all or silver brazed.

An embodiment of a representative pair of serrated water-cooled copper shoes 10 on either side of an example of an Electroslag or Electrogas weld joint for workpieces 300 and 310 depicts the difference in base metal dilution from the heat affected zone 90 for typical water-cooled copper shoes and the heat affected zone 100 for the embodiment of a representative pair of serrated water-cooled copper shoes 10, FIG. 4.

Chamfered edges 14 are provided where the serrated water-cooled copper shoe makes contact with the base or parent material workpieces 300 and 310. These chamfered edges 14 help the molten weld metal 410 to wet against the parent material workpieces 300 and 310, to provide a smooth transition between the weld metal 420 and the parent material workpieces 300 and 310. The preferred embodiment of the Arcmatic® serrated water-cooled copper shoes provides at least one 45 degree chamfered edge 14 with respect to adjacent surfaces of the serrated water-cooled copper shoe, FIG. 13.

Two relief grooves 16 are cast into the forward face of each "Water-Cooled VertaSlag® Butt Welding Shoe™." Two relief grooves are machined into the forward face of each serrated water-cooled copper shoe. These relief grooves are to reduce the amount of surface between the face of the serrated water-cooled copper shoe and the face of the parent material. Reducing the surface area, in turn reduces the amount of heat that the serrated water-cooled copper shoe removes from the surface of the work piece. This reduction in base material heat allows the welding operator to reduce the weld voltage to dramatically decrease the size of the weld nugget and, in turn, decreases the heat input from the welding process into the work piece. This reduction in work piece heat input reduces the size of the weld nugget, and the HAZ. This reduction in overall heat input dramatically improves the physical quality of the weld. These relief grooves 16 for embodiments of the "Serrated Water-Cooled Copper VertaSlag® Butt Welding Shoe™" are provided in two different width sizes: 3 inches wide and 4 inches wide, and a variety of lengths.

Each serrated surface of the Arcmatic® serrated water-cooled copper shoe serves to add a flux coating to the water-cooled copper shoe that insulates the weld puddle from excessive cooling from the serrated water-cooled copper shoes, FIGS. 1-13. This reduction in weld puddle cooling allows the welding operator to reduce the weld voltage to dramatically decrease the size of the weld nugget and, in turn, further decreases the heat input from the welding process into the work piece. The reduction in work piece heat input further reduces the size of the weld nugget, and the HAZ, FIG. 4. The preferred embodiment of the Arcmatic® serrated water-cooled copper shoes provides a serrated surface of evenly sized and spaced ninety-degree serrations, FIGS. 12 and 13.

As depicted in FIGS. 5 and 5A, an embodiment of the serrated water-cooled copper welding shoes provides a portion of the weld wire 372 as a submerged wire extension 376 within the molten slag bath 400. Another portion of the weld wire 372 is an un-submerged wire extension 376 above the molten slag bath 400. In this manner, molten flux droplets 378 transfer into the molten weld material 410. Guide tube 370 length into the weld cavity ends at a distance 374 above the molten slag bath 400.

As depicted in FIGS. 1-13, embodiments of the serrated water-cooled copper welding shoes are applicable to Electroslag or Electrogas welding applications for "T-Welds, Butt-Welds, "Transition Butt Welds", and Corner Welds.

Figure 8:
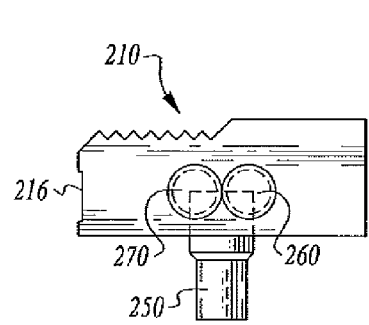
FIG. 8 is a is a top view of an embodiment of a representative serrated water-cooled copper shoe 210 for "T-weld" Electroslag or Electrogas welding applications having dual flow channels of equal cross-sectional area drilled in a copper buss bar 212, outlet water manifold 250, and two plugs 260 and 270.
Figure 9:
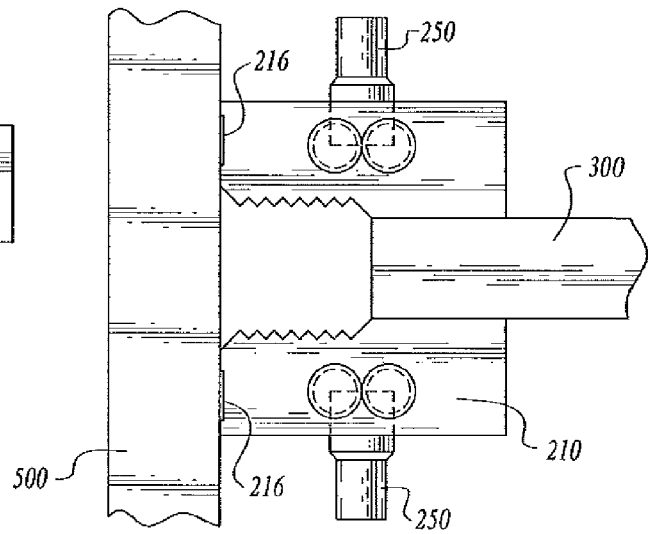
FIG. 9 is a top view of an embodiment of a representative pair of serrated water-cooled copper shoes 210 on either side of an example of a "T-weld" Electroslag or Electrogas weld joint for workpieces 300 and 500.

FIG. 8 provides a top view of an embodiment of a representative serrated water-cooled copper shoe 210 for "T-weld" Electroslag or Electrogas welding applications having dual flow channels of equal cross-sectional area drilled in a copper buss bar 212, outlet water manifold 250, and two plugs 260 and 270. FIG. 9 provides a top view of an embodiment of a representative pair of serrated water-cooled copper shoes 210 on either side of an example of a "T-weld" Electroslag or Electrogas weld joint for workpieces 300 and 500. The embodiment of a representative serrated water-cooled copper shoe 210 for "T-weld" Electroslag welding applications provides a relief groove 216 on a side surface of the serrated water-cooled copper shoe 210, FIGS. 8 and 9, to reduce the base input into workpiece 500, FIG. 9.

Figure 10:
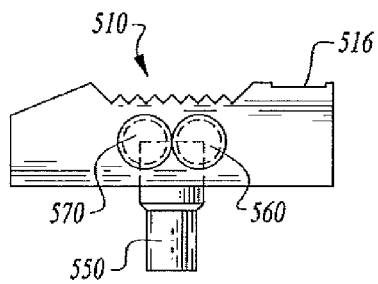
FIG. 10 is a is a top view of an embodiment of a representative serrated water-cooled copper shoe 510 for "Transition-weld" Electroslag or Electrogas welding applications having dual flow channels of equal cross-sectional area drilled in a copper buss bar 512, outlet water manifold 550, and two plugs 560 and 570.
Figure 11:
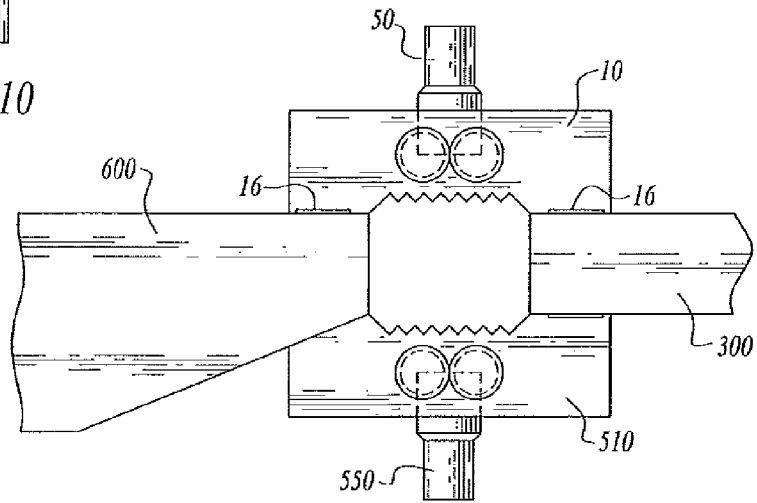
FIG. 11 is a top view of an embodiment of a representative pair of serrated water-cooled copper shoes 10 and 510 on either side of an example of a "Transition-weld" Electroslag or Electrogas weld joint for workpieces 300 and 600, wherein the transition slope for workpiece 600 is 2.5:1 run to rise.
Figure 12:
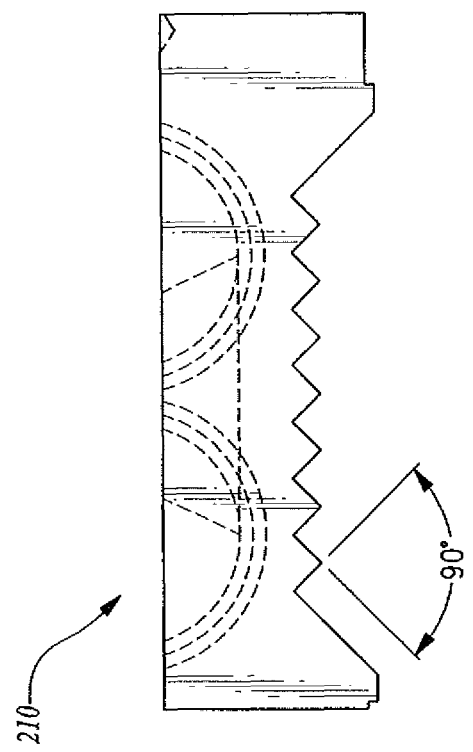
FIG. 12 is a top detail view of an embodiment of a representative serrated water-cooled copper shoe 210 of FIG. 8, depicting a serrated surface of evenly sized and spaced ninety-degree serrations.
Figure 13:
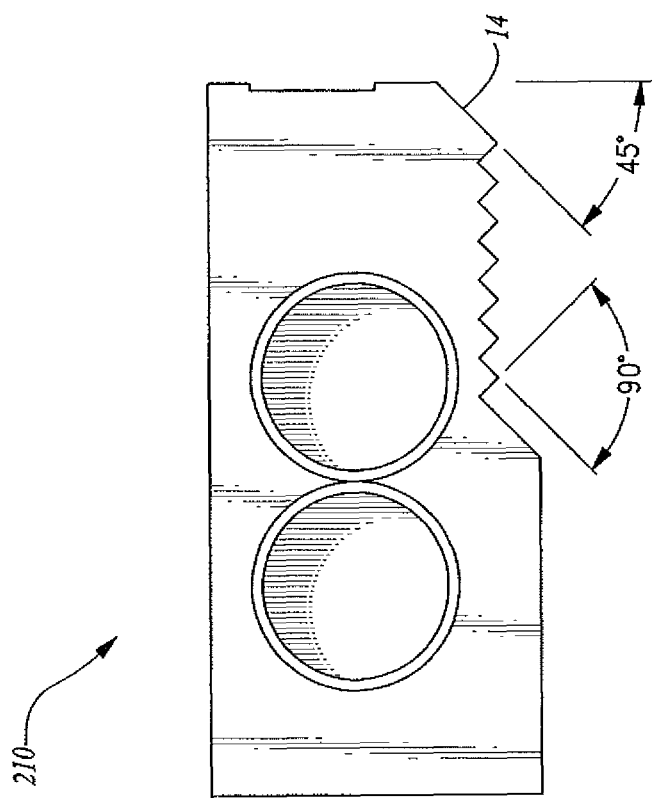
FIG. 13 is a top detail view of an embodiment of a representative serrated water-cooled copper shoe 210 of FIG. 8, depicting a serrated surface of evenly sized and spaced ninety-degree serrations and at least one 45 degree chamfered edge 14 with respect to adjacent surfaces of the serrated water-cooled copper shoe.

FIG. 10 provides a top view of an embodiment of a representative serrated water-cooled copper shoe 510 for "Transition-weld" Electroslag or Electrogas welding applications having dual flow channels of equal cross-sectional area drilled in a copper buss bar 512, outlet water manifold 550, and two plugs 560 and 570. FIG. 11 provides a top view of an embodiment of a representative pair of serrated water-cooled copper shoes 10 and 510 on either side of an example of a "Transition-weld" Electroslag or Electrogas weld joint for workpieces 300 and 600. The embodiment of a representative serrated water-cooled copper shoe 510 for "Transition-weld" Electroslag welding applications provides a relief groove 516 on a forward face surface of the serrated water-cooled copper shoe 510, FIGS. 10 and 11, to reduce the base input into workpiece 300, FIG. 11. The standard "Water-Cooled VertaSlag® Butt Welding Shoe™" 10 has two relief grooves 16 are cast into the forward face to reduce the base input into workpieces 300 and 600, FIG. 11. Workpiece 600 provides a transition slope of 2.5:1 run to rise.

During an Electroslag or Electrogas welding operation, the new Arcmatic® "Serrated Water-Cooled VertaSlag® Butt Welding Shoe", using serrated surfaces of the water-cooled copper shoe relief groove adjacent to the weld puddle and weld cavity, allows welding flux to flow into the serrated grooves of the copper shoe. Because of the depth of the grooves, the flux buildup on the surface of the serrations is much thicker than a water-cooled shoe without serrated grooves. This thicker flux buildup acts as an insulator between the surface of the water-cooled copper shoe and the molten weld puddle, allowing the molten weld puddle to stay hot and flow into the corners of the weld cavity. The flux buildup allows the center serrated copper shoe that comes in contact with the molten weld puddle to stay hot, while, at the same time, the edges of the water-cooled copper that do not have flux buildup on the surface, stay at 150 degrees Fahrenheit to 200 degrees Fahrenheit. This allows the previously mentioned weld to be made at 1000-Amps and 28-Volts (instead of 38-Volts). Another factor that affects the total heat input into the weld is that the high temperature of the serrated water-cooled copper shoe, allows the weld travel speed to be substantially increased. If the voltage is decreased from 38V to 28V, the total wattage into the weld would then equal 14 kilowatts (1000×28/2=14-KW) instead of the 19-kilowatts required when welding with standard water-cooled copper shoes—a 26% reduction in heat input compared with using standard water-cooled shoes.

This massive heat reduction will result in a smaller HAZ and far less base metal dilution. The base metal dilution of the 38-Volt weld will require approximately 50% of the base material, while the 28-Volt weld will require approximately 30-to-40% base metal dilutions. Lower heat input and lower base metal dilution will result in a smaller grain structure in the weld and a much better toughness (higher charpy impact test results) in the weld metal and the HAZ.

Figure 6:
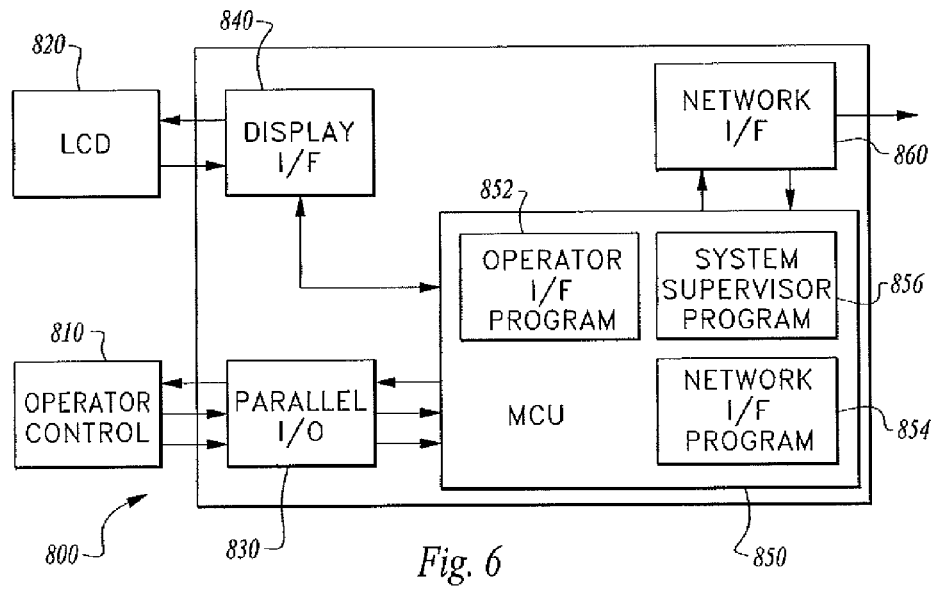
FIG. 6 is schematic of the distributed welding control system 800 for the ESW and ESW-NG welding method and system, including control over the temperature control of the embodiments of serrated water-cooled copper shoes, including the operator's control panel 810 and liquid crystal display (LCD) 820, parallel input and output unit 830, display interface 840, microprocessor control unit 850, operator interface program 852, network interface program 854, system supervisor program 856, and network interface 860.
Figure 7:
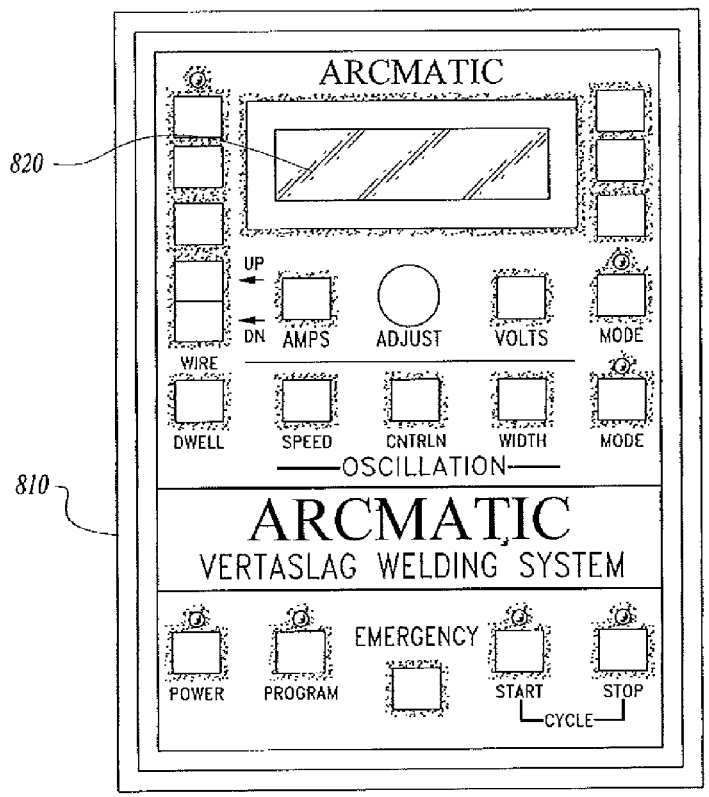
FIG. 7 is a planar view of the face of the operator control panel 810 of the distributed welding control system 800 of FIG. 6, including the liquid crystal display ("LCD") 820.

The welding process and the welding procedures for serrated water-cooled copper welding shoes 10 including, but not limited to, the "Serrated Water-Cooled Copper VertaSlag® Butt Welding Shoe™" can be pre-programmed into the Arcmatic™ programmable, computer controlled integrated welding system, FIGS. 6-7. The Arcmatic® distributed welding control system 800 provides fully automatic control over the serrated water-cooled copper welding shoes and related welding process from the operator's control panel 810. The automated control of the serrated water-cooled copper welding shoes components includes a single pendant controller that provides overall system control for a number of discreet motion control networks including microprocessor modular distributed control of each welding torch, each welding torch slide assembly, countercurrent water circulation through the serrated water-cooled copper shoes, each wire feed conduit, each high current welding cable, welding power supply, and each Electroslag or Electrogas weld within each welding cavity through a system supervisor program 856, network interface program 854, and an operator interface program 852 of a microprocessor control unit 850. Accordingly, the welding operator for any disclosed method and system of welding using water-cooled copper shoes principally needs to be a skilled operator capable of setting up the weld and running the pre-qualified welding programs. The same welding control system and methods used for Arcmatic® VertaSlag® welds of the '019 application and/or the '297 application, and/or the '472 patent, the '716 patent, and/or the '159 patent, are used to operate and control the method and system of welding including, but not limited to, automating the serrated water-cooled copper welding shoes "on the job" in the field.

Therefore, the foregoing is considered as illustrative only of the principles of the serrated water-cooled copper welding shoes. Additionally, since numerous modifications and changes will readily occur to those skilled in the art, it is not desired to limit the serrated water-cooled copper welding shoes to the exact construction and operation shown and described, and further, all suitable modifications and equivalents may be resorted to, falling within the scope of the serrated water-cooled copper welding shoes.

I claim:

1. A welding shoe comprising, in combination:
    a) at least one copper buss bar having a forward face and a backward face, wherein the forward face comprises a rigid serrated surface adjacent to a weld cavity;
    b) at least one first dual flow water channel within each copper buss bar, each first dual flow water channel having an upper section and a lower section;
    c) at least one second dual flow water channel within each copper buss bar, each second dual flow water channel having an upper section and a lower section;
    d) at least one water flow manifold communicating with the first and second dual water flow channel lower sections;
    e) at least one water flow manifold communicating with the first and second dual water flow channel upper sections;
    f) a first copper shoe plug capping each first dual flow water channel upper section;
    g) a second copper shoe plug capping each second dual flow water channel upper section; and
    h) at least one controller module for regulating a countercurrent flow of water through the water flow manifolds and water flow channels of each welding shoe.

2. The welding shoe of claim 1, wherein all channels, manifolds, and plugs are fusion welded with electron beam fusion welds.

3. The welding shoe of claim 1, wherein the welding shoe temperature is maintained at a temperature range of between 150 degrees Fahrenheit to 200 degrees Fahrenheit during an Electroslag or Electrogas welding operation.

4. The welding shoe of claim 1, further comprising at least one chamfered edge on the forward face of each copper buss bar.

5. The welding shoe of claim 1, further comprising evenly sized and spaced ninety-degree serrations.

6. A welding shoe for Electroslag or Electrogas welding systems, each shoe comprising, in combination:
    a) at least one copper buss bar having a forward face length and a backward face, and comprising at least one chamfered edge on the forward face, at least two relief grooves cast into the forward face, and a rigid serrated surface cast into the entire forward face length adjacent to a weld cavity;
    b) at least one electron beam fusion welded or silver brazed, first dual flow water channel within each copper buss bar, each first dual flow water channel having an upper section and a lower section;
    c) at least one electron beam fusion welded or silver brazed, second dual flow water channel within each copper buss bar, each second dual flow water channel having an upper section and a lower section;
    d) at least one electron beam fusion welded or silver brazed, water flow manifold communicating with the first and second dual water flow channel lower sections through the backward face of each copper buss bar;
    e) at least one electron beam fusion welded or silver brazed, water flow manifold communicating with the first and second dual water flow channel upper sections through the backward face of each copper buss bar;
    f) an electron beam fusion welded or silver brazed, first copper shoe plug capping each first dual flow water channel upper section;
    g) an electron beam fusion welded or silver brazed, second copper shoe plug capping each second dual flow water channel upper section;
    h) at least one distributed control system having at least one controller module for regulating a countercurrent flow of water through the manifolds and water flow channels of each water cooled shoe for controlling a temperature of the water cooled copper shoes at a temperature range of between 150 degrees Fahrenheit to 200 degrees Fahrenheit during an Electroslag or Electrogas welding operation.

7. The welding shoe of claim 6, wherein the rigid serrated surface further comprises evenly sized and spaced ninety-degree serrations.

* * * * *